Nov. 12, 1929.     J. F. WEATHERLY     1,735,624
APPARATUS FOR PACKING FRUIT
Original Filed July 26, 1927
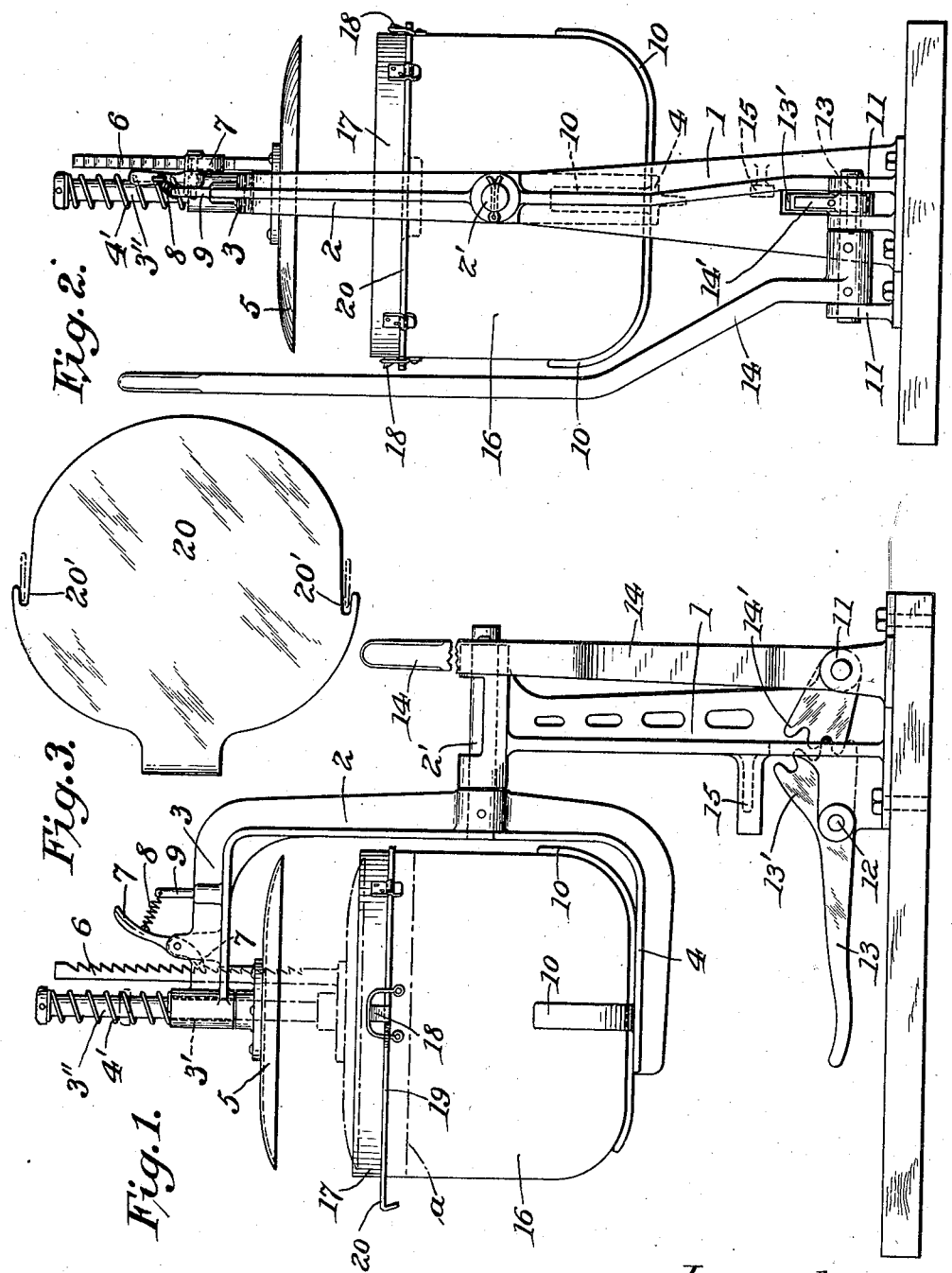
Inventor:
John F. Weatherly,
by Spear Middleton Donnesen & Hall
Attys.

Patented Nov. 12, 1929

1,735,624

UNITED STATES PATENT OFFICE

JOHN F. WEATHERLY, OF CHATTANOOGA, TENNESSEE

APPARATUS FOR PACKING FRUIT

Application filed July 26, 1927, Serial No. 208,525. Renewed April 5, 1929.

This invention relates to apparatus for packing fruit or the like.

An object of the invention is to provide apparatus whereby the fruit may be readily and efficiently packed and regularly and evenly faced so as to display it to the best advantage.

A further object is to provide apparatus which is adapted to permit ready inversion of the package of fruit during the packing and pressing operations.

Another object is to enable the fruit to be faced, and pressed in the pack in faced condition.

The invention resides in the features, combination and arrangement of parts hereinafter described and particularly pointed out in the claims.

With reference to the accompanying drawings

Figure 1 is a side elevation of the apparatus with the basket in place thereon.

Fig. 2 is a front view of the apparatus.

Fig. 3 is a view of the removable support.

1 is the main frame or support of the packer in the upper end of which, as shown at 2', is pivoted or swiveled the bracket 2. The bracket 2 has laterally extending arms 3 and 4. The outer end of arm 3 is provided with a vertical bore 3' in which slides a rod 3" which carries a concave fruit face former or covering member 5 at its lower end. The rod 3" has secured thereto at its upper end, one end of a coil spring 4', which surrounds the rod and bears at its other end against the arm 3. Secured to the facing form 5 is a vertically extending ratchet member 6 which is adapted to cooperate with a pawl 7 which is pivotally mounted on the arm 3 and yieldably held in engagement with the ratchet by spring 8 secured to post 9 on the arm 3. The ratchet 6 being substantially an integral part of the fruit face former 5 by cooperating with the pawl 7 holds the face former 5 against rotary motion and arrests it in its vertical movement at any desired point.

Mounted on the arm 4 is a basket support comprising curved arms 10, there being preferably three of these arms extending from the arm 4 to either side, and one extending to the rear, the side arms serving to guide the basket into position and the rear arm arresting it to align vertically with the fruit face former 5. In connection with the fruit face former the basket support serves to hold the basket of fruit during the process of forming the face and completing the pack.

The main frame 1 is provided with bearings 11 and 12 near its base. Upon the bearing 12 is pivotally supported a lever 13 which is provided with a toothed segment 13' engaging a toothed segment 14' of a lever 14 pivotally mounted on the bearing 11. The purpose of this interlocking toothed connection is to impart vertical movement to the outer end of lever 13 by manipulation of lever 14 forward or backward with respect to the packing apparatus. That is, when the lever 14 is drawn toward the front of the packer, the outer end of lever 13 will rise, A stop 15 is cast integral with the main frame 1. The stop 15 is so disposed in its relation to the bracket 2 as to allow the end carrying the arm 4 to clear the stop when the packer is turned or reversed, but arresting the longer end of the bracket 2 carrying the fruit face former, when the packer is reversed so that the stem or rod 3" of the fruit face former will stop directly above the outer end of the lever 13.

16 is an ordinary fruit basket upon the upper end or rim of which is placed a facer ring 17 which is provided with bracket handle engaging cam 18 which are wedge shaped as shown in Fig. 2, and which are adapted to be inserted within the handles.

A steel bottom or fruit support 20, shown in plan view in Fig. 3, forms the bottom for the facer ring 17, and is slightly larger in diameter than the outside diameter of the basket and rests on the basket. As shown in Fig. 3 the support 20 is provided with slots 20' adapted to receive the basket handles and to lock them after the handles have engaged the cams 18. This is accomplished by sliding the bottom 20 endwise after the cams 18 have engaged the basket handles.

The operation of the apparatus is as follows: The basket 16 is first filled with fruit to within a short distance of its top, just enough space being left for the final or top layer of fruit.

In case there is a rush of fruit from the grader in excess of what the packer is capable of handling, the baskets can be partially filled and set aside until such time as the packer is able to face and pack them.

In packing, the facing ring 17 with its bottom 20 can be placed on the partially filled basket and filled away from the packer, and when filled the whole placed in position on the packer, or, the partially filled basket may be placed immediately in position on the packer and the facing ring with its steel bottom can be filled, and then placed in position on the basket which is resting on the basket support of the packer.

The operator then manually presses the fruit face former down until it rests on top of the faced fruit within the facing ring 17 as shown in dotted lines in Fig. 1. This operation is readily performed by pressing with the hand on the fruit face former, the spring 4' yielding readily to any downward force in excess of the weight of the fruit face former and its stem. That is, the spring is only made strong enough to support the fruit face former and its stem.

When the fruit face former has been forced down until it reaches the point shown in dotted lines in Fig. 1 owing to the fact that the bottom of the basket is resting on the basket support formed by the arms 10 and is held centrally by these arms, and the further fact that the face-former is resting on the faced fruit within the ring 17 and the fruit in turn is resting on the steel bottom 20 and the steel bottom 20 in turn is resting on the top of the basket the faced fruit within the ring 17 and the partially filled basket 16 are all held rigidly in position the packer by virtue of the pawl 7 engaging the teeth of the ratchet 6.

At this stage of operation the top of the fruit in the partially filled basket will be substantially on a level with the dotted line a, just below the underside of the bottom plate 20.

When this stage in the operation has been reached the operator reverses the pack by rotating the bracket 2 on its pivot 2' until the upper end of the bracket 2 strikes the stop 15 on the main frame 1, thus arresting the packer with the partially filled basket in an inverted position with the end of the stem of the fruit face former directly above the outer end of the lever 13 and when in this position the layer of faced fruit previously resting on the plate 20 drops down within the fruit face former 5 thereby imparting a convex surface to the faced fruit which previously rested on the bottom plate 20. On the other hand the fruit in the partially filled basket previously resting on the bottom of the basket drops down and comes to rest on the bottom of the steel bottom plate 20. At this stage in the operation the bottom plate 20 is withdrawn by pulling it forward from the pack, thereby allowing the fruit within the basket to drop on to the faced and formed fruit within the concave face former. The operator then reaches back and grasps the top of the hand lever 14 and draws it forward forcing the now faced and cone formed fruit back up into the basket, making a tight even pack. The hand lever is then released, the packer rotated back into its normal position, the fruit face former released by disengaging the pawl 7, the basket removed from the packer, the facing ring 17 disengaged from the handles of the basket and removed from the basket and the pack is complete ready for the top to be fastened into place.

It can readily be seen from the foregoing that there are many advantages inherent in this packer. In the first place the baskets can be filled during rush periods and faced and pressed afterwards. In the next place because the packer is self-contained and the basket held centrally to the fruit face former and when reversed the fruit in the basket is dropped down onto the faced fruit within the face former and afterwards pressed back up into position in the basket, the fruit always presents a uniform appearance. Again the hand lever and its connections constitute a press for pressing the fruit into the pack. Again the necessity for a basket turner is eliminated and because of the location of the swivel bearing the labor of turning the fruit is reduced to a minimum.

The invention is not limited to the particular arrangement shown and many changes may be made within the scope of the invention. For example, the lever 13 may be as readily operated from lever 14 by means of suitably placed bell cranks, and the connection may be so made that pushing the lever 14 away from the packer will cause the outer end of lever 13 to rise, which is the reverse action to that of the structure shown.

I claim:

1. A fruit basket packing device comprising a support, a fruit basket supporting bracket pivotally mounted on said support, a facing form having a stem slidably and adjustably mounted in said bracket and normally disposed above the filled basket to engage fruit carried by the basket to face and hold the fruit upon inversion of the basket and bracket about said pivot.

2. In apparatus according to claim 1, pressing means adapted to cooperate with said stem to press the pack while the basket is inverted.

3. A fruit basket packing device comprising a support, a U-shaped bracket eccentrically pivoted to said support for rotary movement, a fruit basket support mounted on one arm of the bracket and a facing form having a stem slidably and adjustably mounted in the other arm of the bracket and normally disposed above the filled basket and adapted to engage fruit carried by the basket to face and hold the fruit in the basket upon inversion of the basket and bracket about said pivot.

4. A fruit basket packing device comprising a support, a U-shaped bracket eccentrically pivoted to said support for rotary movement, a fruit basket support mounted on the shorter arm of the bracket and a facing form having a stem slidably and adjustably mounted in the longer arm of the bracket, and adapted to engage fruit carried by the basket to face and hold the fruit in the basket upon inversion of the basket and bracket about said pivot, and pressing means adapted to cooperate with said stem to press the pack when the basket is inverted.

5. In apparatus according to claim 4, a stop mounted on said main support and adapted to clear the shorter arm of the bracket and to engage the longer arm of the bracket upon inversion of the pack to aline the the said stem with the pressing means.

6. A fruit basket packing device comprising a support, a fruit basket supporting bracket pivotally mounted on said support, a facing form having a stem slidably and adjustably mounted in said bracket and movable toward or away from the upper end of the basket, a facer ring adapted to be mounted on the upper rim of the basket, said facer ring having projections adapted to extend through the handles of the basket, a removable bottom for said facer ring adapted to rest upon and close the open upper end of the basket, said bottom having slots to receive the handles of the basket and to clamp them in engagement with the facer ring, said facing form being adapted to engage fruit on the removable bottom to face the fruit and hold the pack upon inversion of the basket and bracket about said pivot.

7. In apparatus according to claim 6, said removable bottom being adapted to be removed after inversion of the basket, and pressing means adapted to cooperate with said stem to press the pack while the basket is inverted.

8. A fruit basket packing device comprising a main support, a U-shaped bracket eccentrically pivoted to said support for rotary movement thereon, a fruit basket support mounted on one arm of the bracket and a facing form having a stem slidably and adjustably mounted in the other arm of the bracket and movable toward or away from the upper end of the basket, a facer ring adapted to be mounted on the upper rim of the basket, said facer ring having projections adapted to extend through the handles of the basket, a removable bottom for said facer ring adapted to rest upon and close the upper end of the basket, said bottom having slots to receive the handles of the basket and to clamp them in engagement with the facer ring, said facing form being adapted to engage fruit on the removable bottom to face the fruit and hold the pack upon inversion of the basket and bracket about said pivot, said removable bottom being adapted to be removed after inversion of the basket, and pressing means comprising levers adapted to cooperate with said stem to press the pack while the basket is inverted.

9. In apparatus according to claim 8, said bracket having a longer arm carrying the facing form and a shorter arm carrying the basket support, and a stop on said main support adapted to clear the shorter arm of the bracket but to engage the longer arm upon inversion of the pack to aline the said stem with the pressing means.

10. A fruit basket packing device comprising a support, a basket holding and covering bracket, pivotally mounted on said support whereby the basket may be inverted, adjustable means on said bracket for covering the upper end of the basket, and pressing means on said support for cooperating with said adjustable covering means to press the fruit in the basket, upon inversion of the basket and bracket about said pivot, said covering means also being adapted to face the fruit in the basket during said pressing operation.

11. A fruit basket packing apparatus comprising a ring shaped member adapted to be placed at the top of the basket and having a removable slidable bottom on which facing fruit may be placed, a facing form to be placed at the top of said ring, means for holding the basket with the ring shaped member and facing form assembled therewith and for reversing said basket with said assembled parts whereby upon removal of said sliding bottom the fruit in the basket and that held by the ring and facing form will come together, substantially as described.

12. A fruit packing apparatus according to claim 11 having means for forcing the facing form upwardly in relation to the inverted basket to force the layer of facing fruit together with the body of fruit in the basket, upwardly towards the bottom of said inverted basket, substantially as described.

13. A fruit basket packing apparatus comprising a facing fruit support adapted to be placed at the top of the basket, said support being adapted for removal laterally of the basket, a facing form adapted to be placed in contact with the fruit on said support, means for holding the basket with the support and facing form assembled therewith and for reversing said basket with said assembled parts whereby upon removal of said support, the fruit in the basket and that held by the support and facing form will come together.

14. A fruit basket packing apparatus according to claim 13 having means for forcing the facing form upwardly in relation to the inverted basket to force the layer of facing fruit together with the body of fruit in the basket upwardly towards the bottom of said inverted basket.

15. A fruit basket packing apparatus comprising in combination, a basket support mounted to be inverted with the basket, a facing form movable towards and from the open end of the basket, means for supporting the facing form, a facing ring to connect with the edge of the basket, and a slide carried by said facing ring to cover the open end of the basket.

In testimony whereof, I affix my signature.

JOHN F. WEATHERLY.